United States Patent Office 2,710,014
Patented June 7, 1955

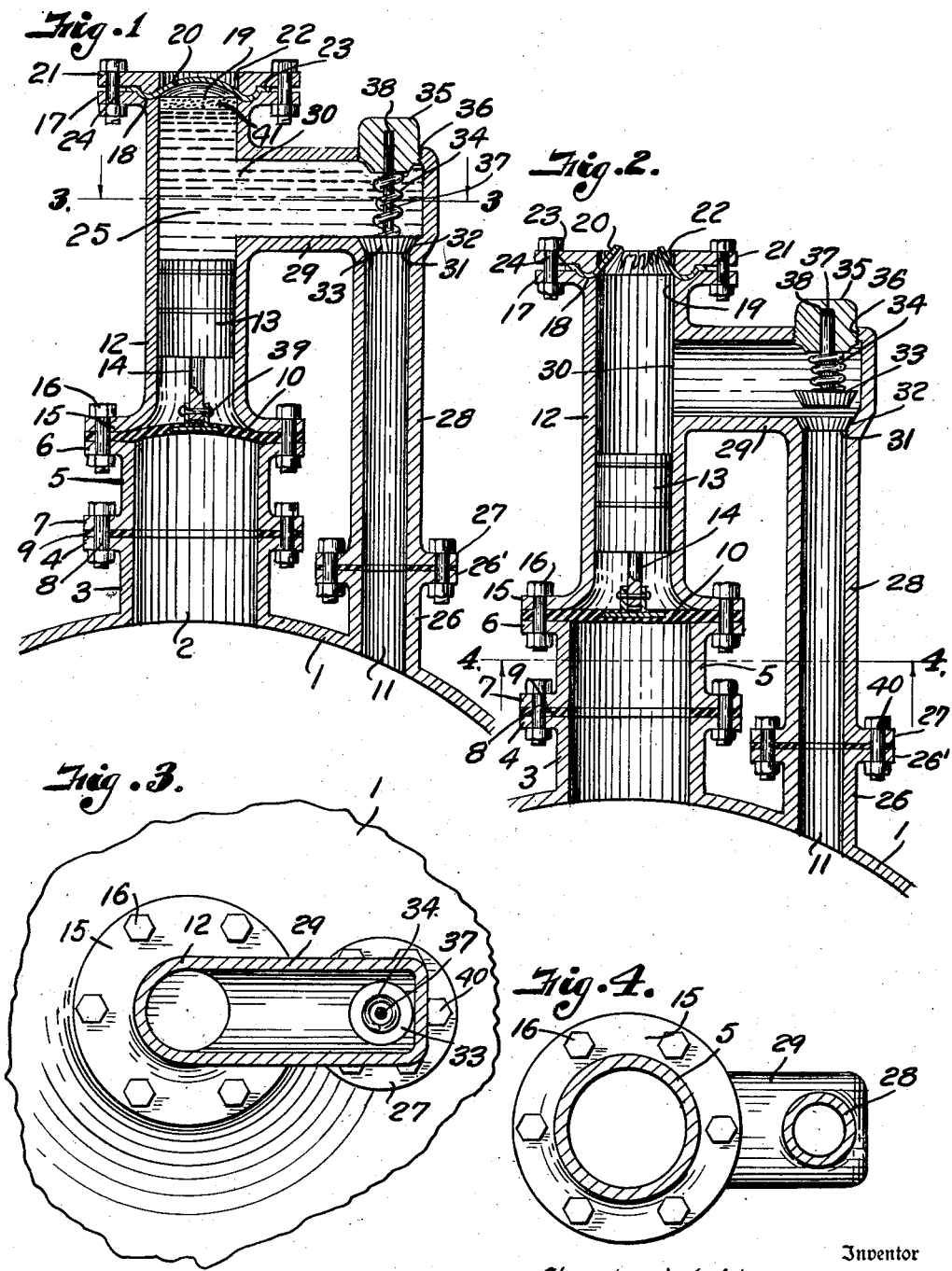

2,710,014

PRESSURE RELEASE APPARATUS

Charles W. Hayes, Kansas City, Mo., assignor to Black, Sivalls & Bryson, Inc., Kansas City, Mo., a corporation of Delaware Application January 16, 1950, Serial No. 138,845

5 Claims. (Cl. 137—70)

This invention relates to safety apparatus for relieving vessels and fluid systems from predetermined pressure differentials and particularly where the pressures are relatively low so that the relief element must function within close limits of the desired pressure.

Frangible safety elements of the type disclosed in the Raymond Patent 1,930,960, October 17, 1933, have proved very satisfactory in providing relief for relatively high pressure differentials but it is difficult to design such diaphragms so that they will function within close limits and low pressure differentials without resorting to expensive metals.

It is, therefore, the principal object of the present invention to provide a safety apparatus utilizing a pressure diaphragm which is adapted to function at a fraction of a pound and thereby provide positive and accurate relief for low pressure vessels and fluid systems.

Other objects of the invention are to provide a safety apparatus capable of utilizing a relatively high pressure safety diaphragm so that it may be constructed of one of the more common and less expensive metals, and to provide a relatively simple actuator adapted to be manipulated by low pressure of the system to effect bursting of the high pressure diaphragm.

In accomplishing these and other objects of the invention hereinafter pointed out, I have provided improved structure the preferred form of which is illustrated in the accompanying drawing wherein Fig. 1 is a fragmentary section through a pressure vessel equipped with a safety apparatus embodying the features of the present invention, and showing the parts intact for maintaining a predetermined low pressure in the vessel.

Fig. 2 is a similar section showing the parts in position after the diaphragm has burst to relieve the vessel.

Fig. 3 is a horizontal section on the line 3—3 of Fig. 1.

Fig. 4 is a horizontal section on the line 4—4 of Fig. 2.

Referring more in detail to the drawings:

1 designates a pressure vessel adapted to contain a fluid under relatively low pressure and which must be protected from damage by predetermined maximum pressure differential which may be relatively close to the working differential of the vessel. In carrying out the invention, the vessel is provided with an opening 2 that is encircled by a collar 3 carrying an annularly extending annular flange 4. Mounted on the flange 4 is the ring 5 substantially corresponding in diameter to the collar 3 and having end flanges 6 and 7, the lower flange 7 being connected to the flange 4 by fastening devices such as bolts 8. When required, a gasket 9 may be inserted between the flanges to provide a leak tight joint. Seated on the flange 6 and subject to pressure within the vessel, is a flexible diaphragm 10 of relatively large area relative to a relief opening 11 that is also provided in the vessel and preferably located adjacent to the opening 2. The marginal edge of the diaphragm 10 is retained in clamping relation with flange 6 by means of a piston cylinder 12 that is of less diameter than the diaphragm 10. Slidably within the cylinder is a piston 13 having connection with the diaphragm 10 by a rod 14 so that when the diaphragm is moved responsive to variation and pressure within the vessel, the piston 13 is correspondingly moved in the cylinder 12. The cylinder 12 has a flange 15 that is retained in clamping relation with the marginal edge of the flexible diaphragm 10 by fastening devices such as bolts 16. The upper end of the cylinder 12 carries an annular flange 17 having a diaphragm seat 18 encircling a relief opening 19 that is closed by a frangible diaphragm 20 which is secured to the seat 18 by a clamping ring 21, which has an opening 22 coaxial with the opening 19. The clamping ring 21 is retained in clamping engagement with the marginal portion or flange 23 of the frangible diaphragm by fastening devices such as bolts 24 so as to close the outlet 19 and retain a body of pressure fluid 25, preferably a liquid between the piston 13 and the underside of the frangible diaphragm 20.

The pressure relief opening 11 of the vessel is formed within a collar 26 which is provided with a laterally extending annular flange 26' for attaching the annular flange 27 of a tubular leg 28 which forms a continuation of the outlet 11 and which connects the upper end of the cylinder 12 through a lateral connection 29. The connection 29 connects with the cylinder chamber through a port 30 and with the leg 28 through a port 31. Encircling the port 31 is a valve seat 32 for seating a check valve 33 that closes the flow from the pressure relief opening 11 when the vessel is operating under normal working pressure. The valve 33 is retained in seated position under such working pressure by a coil spring 34 having one end seated against the valve and its other end bearing on a plug 35 that is threaded within an opening 36 through which the valve 33 is inserted when the parts are assembled.

In order to retain the valve in centered relation with its seat, the valve is provided with a stem 37 which is reciprocable within a bore 38 in the closure plug 35 and which forms a guided support for the spring 34.

With the structure described, the diaphragm 20 may be constructed of one of the more common and inexpensive metals since the bursting pressure thereof may be considerably in excess of the pressure at which the vessel is to be relieved. Such diaphragms may be accurately constructed to function within relatively close limits at high pressure, but they are not suitable to function at, for example, low pressures ordinarily contained in the vessel 1 but with the structure described the relatively low pressure operating on the expanse of the flexible diaphragm 10 applies sufficient pressure on the liquid 25 through movement of the relatively small piston 13 to effect rupturing of the frangible diaphragm 20 when the flexible diaphragm 10 is acted upon by pressures in excess of the desired working pressure in the vessel 1.

In assembling the parts, the piston rod 14 is connected with the flexible diaphragm 10 by means of the pin 39 and the piston is inserted in the cylinder 12. The valve 33 is inserted through the opening 36 to engage the seat 32 and the spring 34 is inserted over the valve stem after which the closure plug 35 is screwed into the opening 36. The ring 5 may then be applied to the outer side of the flexible diaphragm 10 and the bolts 16 inserted to clamp the margin of the diaphragm and form a leak tight joint therearound. The parts are then applied to the collars 3 and 26 and secured in position by insertion of the bolts 8 and bolts 40, gaskets being inserted between the respective flanges. The pressure transmitting fluid 25 such as a liquid is poured into the open upper end of the cylinder 12 to fill the cylinder above the piston 13 and the lateral connection 29 above the valve 33. A frangible diaphragm 20 having the proper bursting pressure is then inserted in the seat 18 and retained in position upon application of the clamping ring 21 and bolts 24.

When the vessel is operating under normal pressures, the piston 13 may reciprocate slightly within the cylinder responsive to movement of the diaphragm 10, however, the body of pressure transmitting fluid does not act upon the frangible diaphragm 20 by reason of the air or gas space 41, that is provided under the concave side of the diaphragm. However, if the rise in pressure on the diaphragm 10 is sufficient to move the piston 13 and column of liquid 25 the pressure will build up on the frangible diaphragm 20 to effect bursting thereof as shown in Fig. 2 whereupon the pressure in the vessel is relieved through the opening 31 by unseating the valve 33, since only a relatively weak spring is needed in retaining the valve in seated position. When the valve opens, the liquid 25 may drain through the relief opening 11, or blow through the bursted diaphragm to provide adequate relief for the accumulated pressure in the vessel.

It is obvious that tthe collar 26, tubular leg 28, connection 29 and cylinder 12 form a flow duct for relief of the pressure in the vessel and that the relief diaphragm 20 is spaced from the check valve 31 and from the piston 13 to provide a normally closed chamber for containing the pressure transmitting medium 25 so that when the pressure in the vessel tends to rise, the flexible diaphragm moves to actuate the piston and exert a bursting pressure on the flexible diaphragm through the normally confined pressure transmitting medium.

From the foregoing it is obvious that I have provided a simple and positively actuating mechanism for utilizing a relatively low pressure for effecting application of a bursting pressure on the frangible diaphragm when a predetermined pressure is reached in a vessel or other fluid containing system.

What I claim and desire to secure by Letters Patent:

1. A safety apparatus for relief of low pressures, including a flow duct having a relief opening, an actuator adapted to be actuated by said low pressure, a piston cylinder forming a part of the flow duct, a piston slidable in the piston cylinder and having connection with the actuator, said actuator being of a larger effective area than the areas of said piston, a frangible diaphragm adapted to burst at a higher pressure than said low pressure, means supporting the frangible diaphragm in closing relation with the relief opening and in position to be ruptured by pressure effected through movement of the piston by said actuator responsive to an increase in said low pressure, and a check valve in said flow duct to render the piston pressure effective on the frangible diaphragm, said check valve being held closed by a fluid contained within that portion of the flow duct between the piston and the check valve and the frangible diaphragm, and said check valve being adapted to open upon release of said fluid from the flow duct incidental to rupture of the frangible diaphragm.

2. A safety apparatus for relief of low pressures, including a flow duct having a relief opening for said low pressures, an actuator subject to the low pressure, a piston cylinder forming a part of the flow duct, a piston slidable in the piston cylinder and having connection with the actuator, said actuator being of larger effective area than the effective area of the piston, a frangible diaphragm adapted to burst at a higher pressure than said pressure at which the low pressures are to be relieved, means supporting the diaphragm in closing relation with the relief opening and in position to be acted upon by pressure effected through the piston by an increase of pressure on said actuator, a check valve in said flow duct to render the piston pressure effective on the frangible diaphragm, and a body of pressure transfer fluid between the check valve and the frangible diaphragm and subject to movement by said piston to hold the check valve closed for transmitting pressure of said fluid on the frangible diaphragm to effect disruption of said frangible diaphragm, said check valve being adapted to open upon release of said fluid through the ruptured diaphragm.

3. A safety apparatus including a piston cylinder having a relief opening, a piston slidable in the cylinder, a pressure relief duct connected with the cylinder between the piston and the relief opening, a frangible diaphragm closing said relief opening, a valve seat in the flow pressure relief duct, a check valve normally engaging said seat for closing flow through said duct to the relief opening, a pressure transmitting fluid in the cylinder between the piston and said frangible diaphragm and the check valve to retain the check valve on said seat, and a flexible diaphragm connected with the piston and subject to pressure common to the pressure in the relief duct and of larger effective area than the effective area of the piston to actuate the piston and effective rupture of the frangible diaphragm, said check valve being adapted to unseat responsive to the flow pressure after fracture of said diaphragm to release the flow pressure through the fractured diaphragm.

4. A safety apparatus for relieving a low pressure including means forming a pressure relief duct for said low pressure and having a relief opening, a frangible diaphragm closing flow through said relief duct and having a higher bursting pressure than the relief pressure, means for confining a body of liquid in contact with the pressure relief side of the diaphragm including a check valve closing off said low pressure from the frangible diaphragm, and actuating means including a portion having an effective area subject to said low pressure and having means provided with an effective area in contact with the body of liquid to apply pressure on said liquid, said effective area of said portion being larger than the area of the liquid contact means, said actuating means being movable responsive to said low pressure for exerting sufficient pressure on said liquid to effect bursting of the diaphragm on response to rise in pressure in the low pressure relief duct, said check valve being adapted to open under said low pressure after rupture of the frangible diaphragm to release said pressure.

5. A pressure release apparatus including means forming a flow duct having an inlet for a pressure fluid and a relief opening, a frangible diaphragm normally closing the relief opening, a check valve in said duct and spaced from the frangible diaphragm for forming a normally closed chamber therebetween to contain a pressure medium, said check valve being held closed by the pressure medium, a piston cylinder in connection with the portion of the flow duct which forms said chamber, a piston in the cylinder and having an effective portion adapted to act on the pressure medium to be contained in said chamber, an actuating diaphragm having a face side subject to the pressure contained in the flow duct on the inlet side of said check valve, and means connecting the piston with the diaphragm, said face side of the actuating diaphragm being of larger effective area than the area of the effective portion of the piston for moving the piston responsive to an increase in the pressure acting on said actuating diaphragm for transmission of said pressure through the piston and said pressure medium to the frangible diaphragm for effecting disruption of the diaphragm, said valve being adapted to open for relief of the pressure fluid through the ruptured diaphragm.

References Cited in the file of this patent

UNITED STATES PATENTS

| Number | Name | Date |
| --- | --- | --- |
| 213,292 | Lunkenheimer | Mar. 18, 1879 |
| 1,779,065 | Grant | Oct. 21, 1930 |
| 1,796,200 | Grieshaber | Mar. 10, 1931 |
| 1,951,897 | Binckley | Mar. 20, 1934 |
| 2,160,137 | Froussard | May 30, 1939 |